United States Patent
Jarvis et al.

(10) Patent No.: US 9,778,934 B2
(45) Date of Patent: Oct. 3, 2017

(54) POWER EFFICIENT PATTERN HISTORY TABLE FETCH IN BRANCH PREDICTOR

(75) Inventors: Anthony Jarvis, Acton, MA (US); James David Dundas, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 1635 days.

(21) Appl. No.: 12/947,401

(22) Filed: Nov. 16, 2010

(65) Prior Publication Data
US 2012/0124349 A1 May 17, 2012

(51) Int. Cl.
*G06F 9/38* (2006.01)

(52) U.S. Cl.
CPC .......... *G06F 9/3848* (2013.01); *G06F 9/3804* (2013.01)

(58) Field of Classification Search
CPC .................................................. G06F 9/3804
USPC ......................................................... 712/240
See application file for complete search history.

(56) References Cited

U.S. PATENT DOCUMENTS

| 5,822,576 | A  | * | 10/1998 | Dinkjian et al. | ............... | 712/239 |
|---|---|---|---|---|---|---|
| 6,598,152 | B1 | * | 7/2003 | Sinharoy | ....................... | 712/228 |
| 2004/0095965 | A1 | * | 5/2004 | McCormick et al. | ........ | 370/532 |
| 2005/0027975 | A1 | * | 2/2005 | Frommer et al. | ............. | 712/240 |
| 2005/0216714 | A1 | * | 9/2005 | Grochowski | ................. | 712/240 |
| 2008/0307209 | A1 | * | 12/2008 | Gschwind | ..................... | 712/239 |
| 2009/0037709 | A1 | * | 2/2009 | Ishii | ............... | 712/240 |
| 2009/0150657 | A1 | * | 6/2009 | Gschwind et al. | ........... | 712/239 |

OTHER PUBLICATIONS

Reinman, G.; Calder, B.; Austin, T.; "Optimizations enabled by a decoupled front-end architecture" . IEEE Transactions on Computers, Apr. 2001, pp. 338-355.*

* cited by examiner

*Primary Examiner* — Jacob A Petranek
(74) *Attorney, Agent, or Firm* — Volpe and Koenig, P.C.

(57) ABSTRACT

A method and apparatus for branch prediction is disclosed. A pattern history table (PHT) is accessed based on at least one global history value to obtain a prediction value. The prediction value and the at least one global history value used to obtain the prediction value are placed in a queue. If a branch prediction is requested, the queue is accessed to obtain a prediction value. The queue may include any number of entries and the queue maintains the oldest prediction value at the head of the queue. The prediction value at the head of the queue is used when a branch prediction is needed.

18 Claims, 3 Drawing Sheets

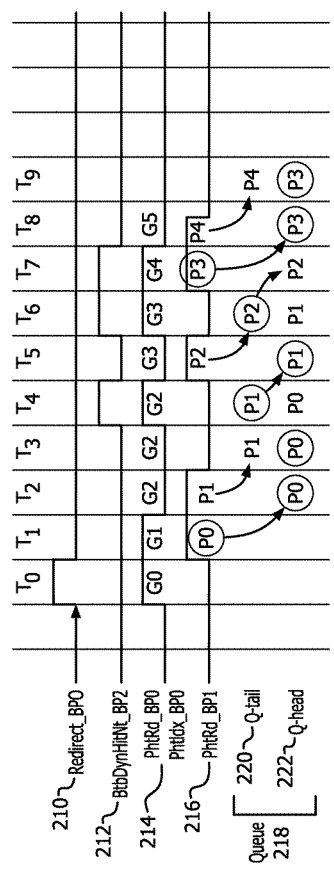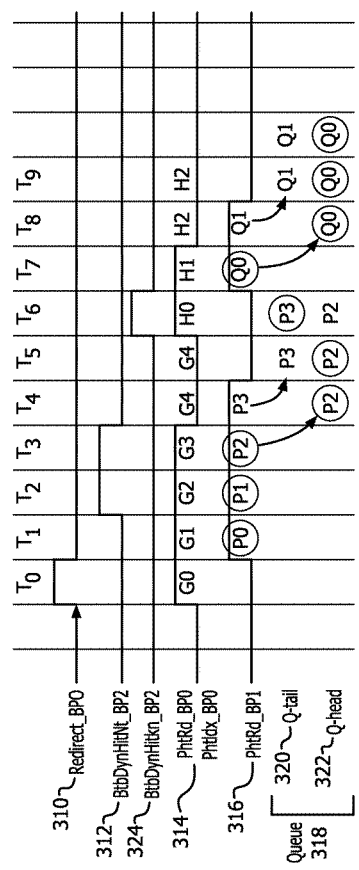

POWER EFFICIENT PATTERN HISTORY TABLE FETCH IN BRANCH PREDICTOR

FIELD OF INVENTION

The present invention relates to processors, including central processing units (CPUs) and graphical processing units (GPUs), and more particularly, to a power efficient method and apparatus for pattern history table fetch in a branch predictor.

BACKGROUND

A processor is tasked with executing a large number of instructions and typically uses an instruction pipeline to increase instruction throughput. An instruction pipeline splits the processing of a computer instruction into a series of independent steps and stores the result at the end of each step. To be able to process the independent steps, an instruction pipeline includes several stages for processing instructions. In one example, a four-stage pipeline may be used, which includes a fetch stage, a decode stage, an execution stage, and a write-back stage. Instructions progress through the pipeline stages in order. For example, each of the independent steps of an instruction will be at the fetch stage at a first time, at the decode stage at a second time, in the execution stage at a third time, and at the write-back stage during a fourth time.

To accelerate processor operations, it is desirable to have as many instructions as possible in the pipeline at the same time. One way of increasing the number of instructions in the pipeline is to fetch subsequent instructions while previous instructions are still being processed in the pipeline. Fetching subsequent instructions may be referred to as "fetching ahead." Problems may arise with fetching ahead because the result of the execution of particular previous instructions may be necessary for the execution of the subsequent instructions that are fetched ahead of time. For example, an instruction may include a "branch," which is typically an "if-then-else" structure that creates a conditional jump. At the time of a conditional jump, it must be determined, based on one or more factors or conditions, whether the jump should be "taken" or "not-taken." The decision at that point in time creates two possible branches, referred to as "taken" or "not-taken" branches. The reason that the decision to take or not take the branch cannot be determined at that particular point in time is because the decision may depend on the result of one or more instructions that are still in the pipeline. Thus, many branch decisions will need to be made before the actual answer is computed by the processor. Waiting for the result of all previous instructions would delay execution of instructions and would eliminate the benefits of using an instruction pipeline.

Therefore, it is desirable to predict whether a branch is taken or not-taken to avoid the delay associated with waiting for the actual branch decision. If the branch prediction is correct, the instruction pipeline may continue normally. If the branch prediction is incorrect, many of the instructions in the instruction pipeline will be using incorrect information. Thus, in the event a branch "misprediction" is discovered, at least a part of the pipeline must be emptied (referred to as a "flush"). Specifically, the instructions that have entered the pipeline more recently than the mispredicted branch must be flushed. Branch predictors were created as a way to make the branch prediction in an educated manner. A branch predictor predicts the direction of a branch instruction (taken or not-taken) and the branch target address before the branch instruction reaches the execution stage in the pipeline.

Branch prediction results in fetching an instruction based on the predicted direction of the branch because a different set of instructions will need to be executed depending on which branch direction is chosen. It may not be determined whether the correct instruction was fetched until the branch instruction reaches the execution stage. However, the determination of which instruction to fetch must be decided at the fetch stage, which occurs before the execution stage. Fetching an instruction before knowing exactly which instruction needs to be executed is called "pre-fetching." Executing an instruction ahead of time based on a branch prediction that may or may not be correct is called "speculatively executing" the instruction. The instruction is considered to be speculatively executed because, at that particular time, it is not known whether the prediction is correct and whether the correct instruction was executed.

Although pre-fetching and speculatively executing instructions without knowing the actual direction of the branch instruction may result in accelerating instruction processing if predicted correctly, it may have the opposite effect and may result in stalling the pipeline if the branch direction is mispredicted. If a branch misprediction occurs, the instruction pipeline needs to be flushed and the instructions from the correct branch direction need to be executed. This may severely impact the performance of the processor.

In attempts to increase the performance of processors, several different types of branch predictors are used. A local branch predictor makes a prediction based on the recent history of a particular conditional jump, and provides a prediction of taken or not-taken. A global branch predictor makes a prediction based upon the recent history of all conditional jumps, not just a particular jump of interest. To make a prediction, a global branch predictor keeps a shared history of all conditional jumps, called global history.

A saturating counter may also be used to increase the effectiveness of a branch predictor. A saturating counter is a state machine with four states. For example, the four states may include "strongly not taken," "weakly not taken," "weakly taken," and "strongly taken." A state machine with four states requires 2 bits to maintain the four states and is considered a "2-bit saturating counter." A saturating counter may be used for each branch and when the branch is evaluated, the state machine is updated. For example, if a branch is evaluated as "not taken," the state is decremented towards the "strongly not taken" state. Similarly, if a branch is evaluated as "taken," the state is incremented towards the "strongly taken" state. Thus, a saturating counter in the "strongly taken" state will only decrement to "weakly taken" when a not-taken branch is evaluated. In this way, a particular branch must deviate twice from what it has done most in recent history before the prediction changes. In the example described above, the next prediction will be "taken." However, if the next evaluation is another not-taken branch, the state will be changed to "weakly not taken" and the following prediction will be "not taken."

A two-level adaptive predictor with a globally shared history buffer, a pattern history table (PHT), and/or an additional local saturating counter may also be used to further increase the performance of a branch predictor. The two-level adaptive predictor may increase performance of the processor if conditional jumps are taken according to a regularly occurring pattern. The two-level adaptive predictor maintains a branch history of the last n outcomes of one or more branches and uses a saturating counter for each of the $2^n$ possible branch history patterns. For example, if the last 2 outcomes of a branch are maintained, there are 4 possible binary representations of the last 2 outcomes: 00, 01, 10, or 11. The branch history may be stored in a 2-bit shift register that may be updated each time a new branch outcome is evaluated. In this example, the PHT has 4 entries, one for each of the 4 possible branch history outcomes (00, 01, 10, or 11), and each entry contains a saturating counter that provides a branch prediction based on the outcomes. To access the PHT, a particular saturating counter is selected from the PHT that corresponds to the value stored in the branch history shift register. Thus, the branch prediction is made based on a particular combination of the recent branch history and not simply based on the last branch that was evaluated.

An example of the advantages of this approach can be seen if the correct branch direction alternates between taken and not-taken each time. In that case, a single branch predictor may guess incorrectly every time. However, a consideration of the recent branch history and a saturated counter pertaining to that particular history may allow such a pattern to be correctly predicted. For example, if the branch direction alternates each time, the recent history would be represented as "01010101 . . . " Because the pattern continues to alternate, the saturating counter in the PHT corresponding to a history of "01" would indicate that the next branch is "strongly not taken" because the branch direction following "01" has always been "0." Similarly, a history of "10" would indicate that the next branch is "strongly taken" because the branch direction following "10" has always been "1." If this pattern persists, there will be no entries related to a history of "00" or "11" because those histories do not exist in the alternating branch direction scenario used in this example.

The branch prediction mechanisms described above may be used alone or may be used in any combination simultaneously. For example, if more than one branch predictor is used, a final prediction may be made either based on a meta-predictor that remembers which of the predictors made the best predictions in the past or based on a majority vote among an odd number of different branch predictors.

Branch predictors are typically large and complex structures. As a result, they consume a large amount of power and incur a latency penalty when predicting branches. Thus, it would be desirable to further increase the effectiveness of branch predictors, because better branch prediction has an impact on the performance and the power efficiency of the processor.

SUMMARY

A method for branch prediction begins by accessing a pattern history table (PHT), based on at least one global history value, to obtain a prediction value. The prediction value and the at least one global history value used to obtain the prediction value are placed in a queue. If a branch prediction is requested, the queue is accessed to obtain a prediction value.

An apparatus for branch prediction includes a PHT and a queue. The PHT is configured to be accessed, based on at least one global history value, to obtain a prediction value. The queue is configured to hold the prediction value and the at least one global history value used to obtain the prediction value if the prediction value is not used, and configured to be accessed to obtain the prediction value if a branch prediction is requested A computer readable storage medium storing a set of instructions for execution by a general purpose computer for performing branch prediction includes a first accessing code segment, a placing code segment, and a second accessing code segment. The first accessing code segment accesses a PHT based on at least one global history value to obtain a prediction value. The placing code segment places the prediction value and the at least one global history value used to obtain the prediction value in a queue if the prediction value is not used. The second accessing code segment accesses the queue to obtain the prediction value if a branch prediction is requested.

BRIEF DESCRIPTION OF THE DRAWINGS

A more detailed understanding of the invention may be had from the following description, given by way of example, and to be understood in conjunction with the accompanying drawings, wherein:

FIG. 2 shows an example of a pipeline along with a two-entry queue that stores prediction values;

FIG. 3 shows another example of a pipeline along with a two-entry queue that stores prediction values.

DETAILED DESCRIPTION

Figure 1:
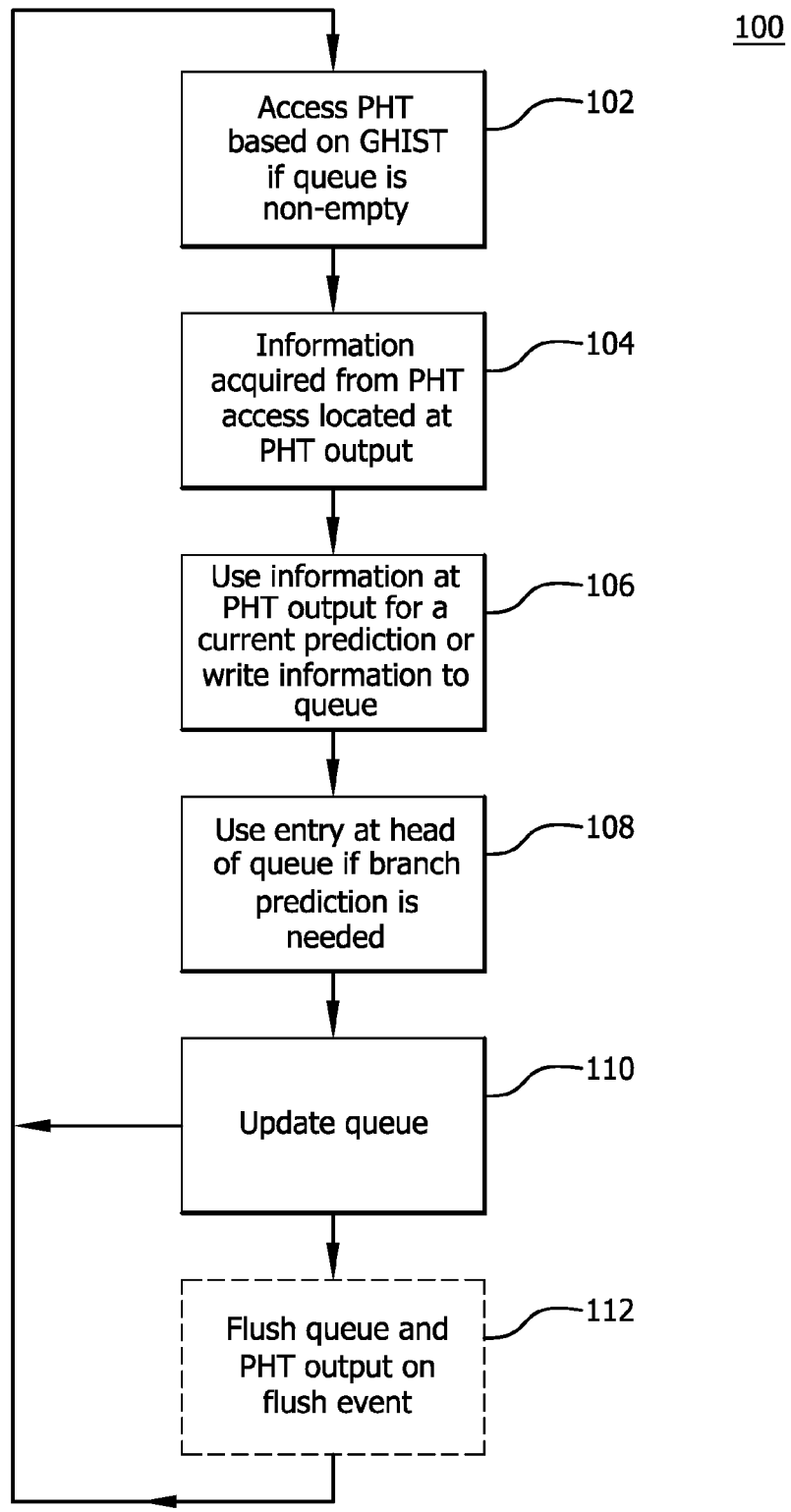
FIG. 1 is a flow diagram of a method for maintaining and accessing a queue that holds prediction values.

The following describes an enhancement for performing fetches from a PHT used in conjunction with branch prediction. The PHT that is used may include saturating counters for some or all outcomes of a chosen combination of global history (GHIST) and address. Thus, the PHT may be accessed based on a combination of global history related to a particular number of past outcomes and address bits. The manner in which the PHT is indexed, read, and accessed is of particular importance from an efficiency and performance viewpoint. Unfortunately, due to the instruction pipeline architecture, the address bits of the most recent branch outcomes may not be known at a time when it is desirable to access the PHT. To overcome this deficiency, the enhancement described herein allows the PHT to be accessed based on GHIST to provide branch prediction data and further allows the prediction data to be available and used at an earlier time. This is accomplished by decoupling the PHT read port and the fetch pipeline using a first-in-first-out (FIFO) queue. As the PHT is accessed based on GHIST, the information retrieved from the PHT is either used for a prediction or stored in the queue along with the GHIST that was used to read that information from the PHT. At a later time, the information read from the PHT and stored in the queue is available and may be used for a branch prediction.

As instructions flow through the instruction pipeline, a PHT may be accessed based on the recent history of branch outcomes. As explained above, the recent history may be maintained in a shift register. Due to the instruction pipeline architecture, it may take several cycles or time periods to determine the result of recent branch decisions because those decisions may still be in the pipeline. Thus, the exact location or fetch address of the information within the PHT is unknown until after the time at which the location is needed. For example, for any given branch prediction, it is desirable to know the recent history of all branches up to and including the branch prediction at issue. However, several of the most recent history decisions are unavailable because the instructions including the desired branch decisions are still in the pipeline, so the addresses are not yet available. Still, it is desirable to be able to read the PHT for all branch predictions, including the most recent predictions, to determine possible outcomes.

One potential solution for accessing the PHT when a particular branch address is not yet known may be to organize the PHT with multiple read ports so that every cycle, two different addresses may be read. One of these addresses may speculate that the previous access was a taken branch and the other address may speculate that the previous access was a not-taken branch. However, such a solution is not considered acceptable because it requires too large of a table and is inefficient from a power standpoint.

Accessing the PHT by GHIST to generate and store prediction data before the fetch address is known provides an efficient solution. Although the PHT is accessed based on GHIST and fetch address, only the GHIST value is known ahead of time. As explained above, the actual fetch address may not be known until several cycles later. Accessing the PHT using only global history or speculative global history to obtain information that may be stored in a queue and used at a later time for a branch prediction may increase performance and efficiency of the branch predictor.

As explained above, accessing the PHT using global history and storing the obtained prediction data may be accomplished by decoupling the PHT read port and fetch pipeline using a FIFO queue. The PHT may be indexed by GHIST and may be address-independent. The GHIST values may be a sequence of outcomes of previous branches. The PHT may contain prediction data that is particular to a given sequence of GHIST values. The queue may hold the prediction data values that are read from the PHT as well as a snapshot of the GHIST values that were used to perform the read. The size of the FIFO queue may be determined by the pipeline depth between the address generation stage and the branch prediction stage.

The following describes the process by which the PHT is accessed and the queue is filled. When the processor exits a reset and/or after any flush, the PHT is read using an architecturally correct GHIST value. The prediction data obtained from the PHT is initially located at the PHT output. During a later cycle, the prediction data will be placed at the head of the queue. During each cycle that there is a free entry in the queue, the PHT will be accessed. Thus, the PHT will be accessed until the queue is full with valid prediction data and the PHT output contains valid prediction data. For example, in a two-entry queue, the PHT will be accessed until the head of the queue, the tail of the queue, and the PHT output contain valid prediction data. The use of a two-entry queue serves only as an example because the queue may be of any length or size. The GHIST values used for each access to the PHT may be an updated GHIST value provided by the backend, a predicted taken GHIST value, or a speculative not-taken GHIST value. The speculative not-taken GHIST value is a GHIST sequence representing a speculative series of not-taken branches. Thus, during each cycle, it is assumed that the previous branch outcome was not a taken branch and a zero is shifted into the GHIST value to represent the speculative series of not-taken branches. As mentioned above, the PHT is accessed until the head of the tail, the queue of the tail, and the PHT output contain valid prediction data. At that time, the PHT will not be accessed again until a branch is predicted as not-taken using a value from the queue, which causes that single entry to be removed from the queue. The PHT may also be accessed again when a backed redirect flush occurs or a predict-taken flush occurs, each of which requires that the queue be emptied and re-populated.

The following describes the process by which the information stored in the queue is used to make a branch prediction. At any point in time, the entry at the head of the FIFO queue contains the oldest valid entry and is used to predict the direction of the next detected conditional branch. If there are no entries in the queue, the oldest entry and corresponding prediction may be found at the PHT output. This entry will be used to predict the current branch. At a later time, when a conditional branch is detected in the fetch pipeline, the fetch address portion of the PHT address is applied for making the final selection that obtains the prediction direction. If, at any time, the entry at the head of the queue is consumed, the entry at the tail of the queue, if available, is moved to the head of the queue. If there is a value available at the PHT output, that value is moved to the tail of the queue. Then, a new access of the PHT will be performed using the GHIST value stored in the tail with a single 0 shifted-in to represent a not-taken branch. The data retrieved from the PHT access will be available at the PHT output until needed in the queue.

Whenever a taken conditional branch is hit, the head and tail of the queue are flushed along with the data at the PHT output. Flushing is required because the entries in the queue, including the speculative GHIST values, have assumed that each of the branches will be not-taken and zeros were shifted into the GHIST values for that purpose. If a taken branch is hit, then the speculative GHIST values are incorrect because the values represent not-taken branches and therefore need to be flushed. Following the flush, a new PHT access is performed using the GHIST value that was used to predict the predicted taken branch that caused the flush. A "1" is shifted into the GHIST value to represent the taken branch. The data retrieved from the PHT access will be located at the PHT output during the next cycle. If a branch prediction is necessary during the next cycle, then the data at the PHT output will be used for that prediction. If a branch prediction is not necessary during the next cycle, then the data that was located at the PHT output during the previous cycle will be written to the head of the queue because the queue is empty following the flush. Then, another PHT access will be performed using a speculative GHIST value that includes a "0" shifted-in to represent a not taken branch, as described above. Eventually, this data, retrieved based on the PHT access, will be written to the tail of the queue, if the data at the head of the queue is not consumed.

FIG. 1 is a flow diagram of a method 100 for maintaining and accessing a queue that holds prediction values. First, the PHT is accessed based on a GHIST value if the queue is non-empty (step 102). As explained above, the GHIST value may be the actual GHIST value from the backend or may be a speculative GHIST value created by shifting a "0" into the GHIST value. At a later time, the information acquired from the PHT access will be located at the PHT output (step 104). The information located at the PHT output may be used for a current branch prediction, if necessary, or may be written to the first available entry in the queue, if a branch prediction is not currently necessary (step 106). The entry at the head of the queue is used if a branch prediction is needed at any time (step 108). The entry is removed from the queue once it is used. The queue is then updated (step 110). If the entry at the head of the queue was used, then the entry at the tail of the queue is placed at the head if the entry at the tail contains valid data. If the entry at the tail does not contain valid data, then valid data is obtained from the PHT output and placed at the head of the queue. If information is located at the PHT output and valid data was moved from the tail to the head of the queue, then the information at the PHT output is written to the tail of the queue. If a flush event occurs, the information in the head and the tail of the queue as well as the information at the PHT output is flushed (step 112). As explained above, a variety of events may cause a flush, such as, for example, the detection of a taken branch that was not predicted by the branch predictor.

The use of the PHT accesses and queue described above is explained by examples showing a pipeline at various times. In the following examples, a two-entry queue is used and events at three stages of a pipeline are shown. The use of a two-entry queue serves only as an example because the queue may be of any length or size. Further, showing three stages of a pipeline serves only as an example because the pipeline may be any number of stages or may be of various architectural types. Although parts of the following examples do not explicitly show a prediction value located at the PHT output when the queue is full, the PHT may be accessed after the queue is full so that a valid prediction value is located at the PHT output.

FIG. 2 shows an example of a pipeline along with a two-entry queue that stores speculative GHIST prediction values. Because the queue is a FIFO queue, the head of the queue will be written to and accessed first. The back or end of the queue is considered the "tail" and will be written to if the head already contains an entry. If the entry in the head is consumed for a branch prediction, then the entry in the tail will shift to the head if the entry in the tail contains valid data. If the entry in the tail does not contain valid data, then valid data is obtained from the PHT output and placed at the head of the queue. Redirect_BP0 210 shows times at which a redirect occurs, such that the queue will be emptied and the pipeline will be flushed. BtbDynHitNt_BP2 212 shows times at which a dynamic not-taken branch hit is detected in BP2, the third stage in the pipeline in this example. PhtRd_BP0/PhtIdx_BP0 214 shows GHIST values and times at which reads will be initiated based on the GHIST values. PhtRd_BP1 216 shows prediction data corresponding to the GHIST values and times at which data will be read out to the queue during the next cycle. The data located at PhtRd_BP1 216 may be considered to be located at the PHT output, as explained above. The Queue 218 includes Q-tail 220 and Q-head 222. Q-tail 220 shows the entry at the tail of the queue and Q-head 222 shows the entry at the head of the queue.

First, FIG. 2 can be described in terms of filling the queue. At time $T_0$, a redirect occurs which causes the queue to be emptied. At time $T_0$, an access to the PHT based on GHIST value G0 is performed, as shown at BP0. At time $T_1$, P0, the prediction data corresponding to G0, is shown at BP1. Also at time $T_1$, G1 is used for a read and is shown at BP0. At time $T_2$, value P0 may be placed at the head of the queue. Also at time $T_2$, P1, the data associated with G1, is shown at BP1. At time $T_3$, value P1 may be placed at the tail of the queue. By time $T_3$, the queue is now filled and ready to be accessed.

Next, FIG. 2 can be described in terms of servicing the queue during a single branch hit. In this example, whether a particular branch prediction was correct (considered a branch "hit") is typically not discovered until BP2. At time $T_4$, a not-taken branch hit is discovered at BP2. The discovery of the hit of a branch at BP2 may cause two things to happen. First, the entry at the front of the queue will be consumed. At time $T_4$, P0 is at the front of the queue, so P0 will be referred to for the prediction. P0 will be consulted to determine whether the branch prediction for the hit branch was "taken" or "not-taken." Once the entry at the front of the queue is consumed, it is removed from the queue. In this example, P0 is used at time $T_4$ and by time $T_5$, P0 is shown removed from the queue. At time $T_5$, P1 is now at the head of the queue and is ready for the next prediction. Second, in addition to consuming the entry at the front of the queue, another read is started simultaneously. The new read is based on G2 and is denoted by G2 at time $T_4$. Similar to previous cycles, P2, the prediction data corresponding to G2, is shown at BP1 during the next cycle, time $T_5$. At time $T_6$, P2 is placed at the tail of the queue and P1 remains at the head of the queue.

Finally, FIG. 2 also shows an example of back-to-back hits in the pipeline. In this example, the queue demonstrates its functionality under maximal stress and shows that it is capable of supplying as many predictions as necessary. As previously described, at time $T_6$, P1 and P2 are each located in the queue. At times $T_6$ and $T_7$, there are back-to-back not-taken branches. It will be appreciated that back-to-back taken branches will not occur because the pipeline is flushed upon the first taken branch, as explained above. At time $T_6$, P1 is consumed from the queue and consulted for the hit shown at time $T_6$. At the same time, another read, based on G3, is started and is shown at time $T_6$. The second of the back-to-back not-taken branch hits occurs at time $T_7$. At time $T_7$, it is also shown that P2 is now at the front of the queue. P2 is consumed and consulted for the hit shown at time $T_7$. At the same time, another read, based on G4, is started and is shown at time $T_7$. P3 is shown at BP1 at time $T_7$ because G3 was read during the previous cycle. Although P1 and P2 were both consumed during times $T_6$ and $T_7$, the queue is still populated at time $T_8$. P3, which was shown at BP1 during time $T_7$, is now at the head of the queue at time $T_8$. In this way, the queue will always remain populated even if back-to-back not-taken branch hits occur. Also at time $T_8$, P4 is shown at BP1 because a read based on G4 was performed during the previous cycle. At time $T_9$, P4 is shown at the tail of the queue.

FIG. 3 shows a second example of a pipeline. Similarly to FIG. 2, Redirect_BP0 310 shows times at which a redirect occurs, such that the queue will be emptied and the pipeline will be flushed. BtbDynHitNt_BP2 312 shows times at which a dynamic not-taken branch hit is detected in BP2, the third stage in the pipeline in this example. PhtRd_BP0/ PhtIdx_BP0 314 shows GHIST values and times at which reads based on the GHIST values will be initiated. PhtRd_BP1 316 shows prediction data corresponding to the GHIST values and times at which data will be read out to the queue during the next cycle. The data located at PhtRd_BP1 316 may be considered to be located at the PHT output, as explained above. The Queue 318 includes Q-tail 320 and Q-head 322. Q-tail shows the entry at the tail of the queue and Q-head shows the entry at the head of the queue. In addition to the elements included in FIG. 2, FIG. 3 also includes BtbDynHitTkn_BP2 324 which shows times at which a dynamic not-taken branch hit is detected in BP2, the third stage in the pipeline in this example.

At time $T_0$, a redirect occurs which causes the queue to be emptied. At time $T_0$, an access to the PHT based on GHIST value G0 is performed, as shown at BP0. At time $T_1$, P0, the prediction data corresponding to G0, is shown at BP1. Also at time $T_1$, a read based on G1 is performed and is shown at BP0. At time $T_2$, value P0 is consumed because a branch hit is detected at time $T_2$. Thus, P0 is never placed at the head of the queue. Also at time $T_2$, P1, the data associated with G1, is shown at BP1. Also at time $T_2$, a read based on G2 is performed and is shown at BP0. At time $T_3$, value P1 is consumed because a branch hit is detected at time $T_3$. Thus, P1 is never placed in the queue and the queue is still empty at time $T_3$. Also at time $T_3$, G3 is shown at BP0 and P2 is shown at BP1. At time $T_4$, there is no branch hit, so P2 is placed at the head of the queue. Also at time $T_4$, P3 is shown at BP1. At time $T_5$, P3 is placed at the tail of the queue. At time $T_6$, a taken branch is detected, so the queue will be flushed or emptied, as described above. Also at time $T_6$, an access to the PHT based on GHIST value H0 is performed, as shown at BP0. H0 represents that a new GHIST value is used that is not continuous with G1, G2, G3, or G4. At time $T_7$, Q0, the prediction data corresponding to H0, is shown at BP1. Q0 represents a new sequence that is discontinuous from P0, P1, P2, and P3 because the taken branch was detected. Because P0, P1, P2, and P3 were prediction values based on a sequence of global history values that had an additional zero shifted in to represent not-taken branch predictions, those values are no longer valid after a taken branch is detected. At time $T_8$, Q0 is placed at the head of the queue and Q1 is shown at BP1. At time $T_9$, Q1 is placed at the tail of the queue, leaving the queue full and available for future accesses.

Figure 4:
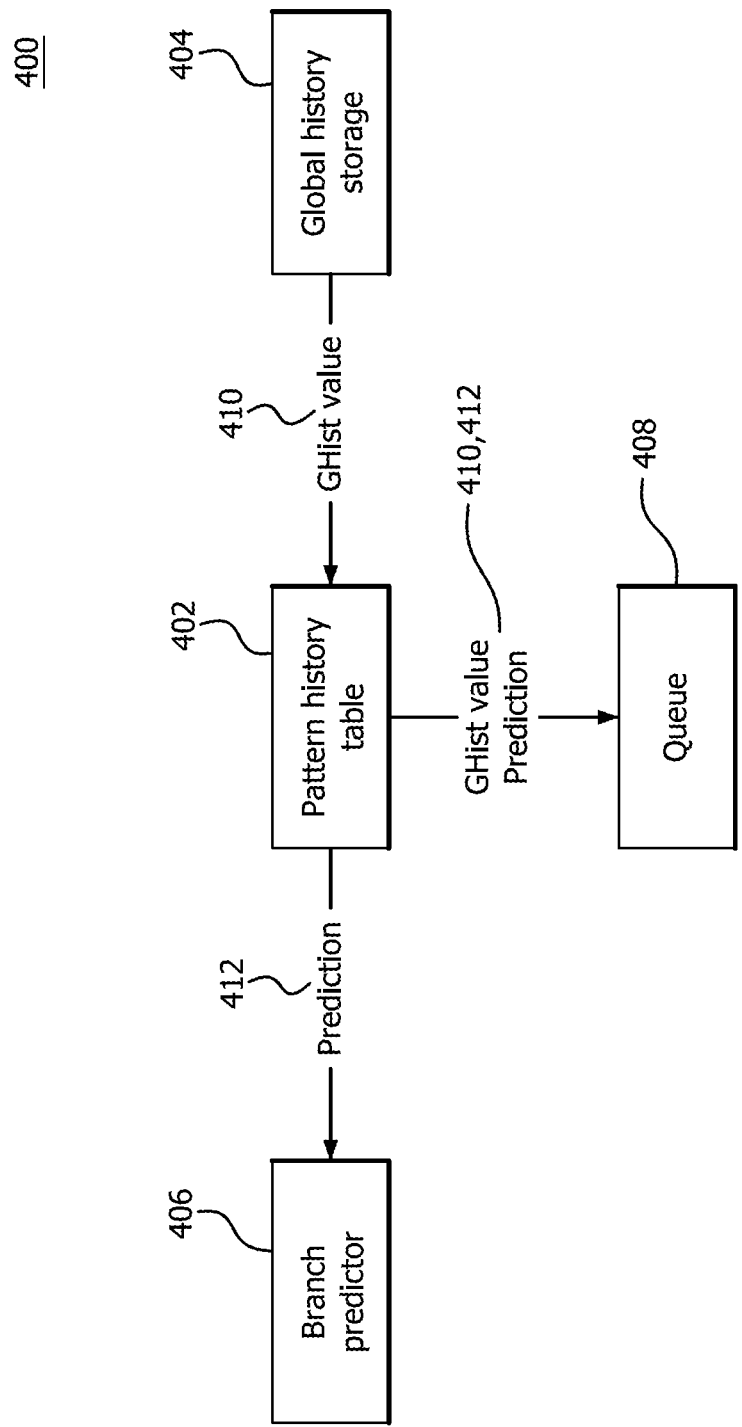
FIG. 4 is a block diagram of a portion of a processor including a queue that stores prediction values.

FIG. 4 is a block diagram of a portion of a processor 400 including a queue that stores prediction values. The portion of the processor 400 shown in FIG. 4 includes a pattern history table 402, a global history (GHist) storage 404, a branch predictor 406, and a queue 408. The pattern history table 402 uses a GHist value 410 to make a prediction 412. If the prediction 412 is needed in a current cycle, the prediction is consumed by the branch predictor 406. If the prediction 412 is not needed in the current cycle, the GHist value 410 and the prediction 412 are stored in the queue 408.

The present invention may be implemented in a computer program tangibly embodied in a computer-readable storage medium containing a set of instructions for execution by a processor or a general purpose computer. Method steps may be performed by a processor executing a program of instructions by operating on input data and generating output data.

Although features and elements are described above in particular combinations, each feature or element can be used alone without the other features and elements or in various combinations with or without other features and elements. The methods or flow charts provided herein may be implemented in a computer program, software, or firmware incorporated in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, both general and special purpose processors. Suitable processors include, by way of example, a general purpose processor, a special purpose processor, a conventional processor, a digital signal processor (DSP), a plurality of processors, one or more processors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors may be manufactured by configuring a manufacturing process using the results of processed hardware description language (HDL) instructions (such instructions capable of being stored on a computer readable media). The results of such processing may be maskworks that are then used in a semiconductor manufacturing process to manufacture a processor which implements aspects of the present invention.

Typically, a processor receives instructions and data from a read-only memory (ROM), a random access memory (RAM), and/or a storage device. Storage devices suitable for embodying computer program instructions and data include all forms of non-volatile memory, including by way of example, semiconductor memory devices, magnetic media such as internal hard disks and removable disks, magneto-optical media, and optical media such as CD-ROM disks and DVDs. In addition, while the illustrative embodiments may be implemented in computer software, the functions within the illustrative embodiments may alternatively be embodied in part or in whole using hardware components such as ASICs, FPGAs, or other hardware, or in some combination of hardware components and software components.

While specific embodiments of the present invention have been shown and described, many modifications and variations could be made by one skilled in the art without departing from the scope of the invention. The above description serves to illustrate and not limit the particular invention in any way.

What is claimed is:

1. A method for branch prediction for a processor, the method comprising:
   emptying a queue of an instruction pipeline if a taken branch is detected;
   in a first execution cycle, accessing a pattern history table (PHT) using a first global history value;
   in a second execution cycle immediately subsequent to the first execution cycle, generating a first branch prediction data from the PHT based on the first global history value;
   in a third execution cycle immediately subsequent to the second execution cycle:
      if the queue is empty and there is a correctly predicted not-taken branch, then using the generated first branch prediction data for a branch prediction value in the third execution cycle, and
      if there is not a correctly predicted not-taken branch, then entering the generated first branch prediction data in a first portion of the queue; and
   in a fourth execution cycle immediately subsequent to the third execution cycle, if there is a correctly predicted not-taken branch, using the first branch prediction data in the first portion of the queue for the branch prediction value and removing the first branch prediction data from the first portion of the queue; and
   repeating a sequence of the first execution cycle through the fourth execution cycle as long as a taken branch is not detected, such that actions taken in one iteration of the sequence may overlap the actions taken in another iteration of the sequence.

2. The method of claim 1, wherein the first global history value is a speculative history value.

3. The method of claim 2, wherein the speculative history value represents that one or more future branches are not-taken.

4. The method of claim 1, wherein the queue is a first-in-first-out (FIFO) queue.

5. The method of claim 1, wherein a size of the queue is determined by a pipeline depth between an address generation stage and a branch prediction stage of the processor.

6. The method of claim 1, further comprising:
   flushing the queue responsive to at least a part of the instruction pipeline being flushed.

7. The method of claim 1, further comprising:
in a subsequent second execution cycle, generating a second branch prediction data from the PHT based on a second global history value;
in a subsequent third execution cycle, if there is not a correctly predicted not-taken branch, then entering the generated second branch prediction data in a second portion of the queue; and
wherein if the first branch prediction data in the first portion of the queue is used for the branch prediction value and removed from the first portion of the queue:
moving the generated second branch prediction data into the first portion of the queue.

8. The method of claim 1, wherein the PHT includes saturating counters for all values of a combination of global history values and address.

9. An apparatus for branch prediction for a processor, comprising:
a pattern history table (PHT) configured to be accessed based on a first global history value to obtain a first prediction value;
a queue of an instruction pipeline configured to hold the first prediction value and the first global history value used to obtain the first prediction value wherein the processor is configured to:
empty the queue if a taken branch is detected;
in a first execution cycle, access the PHT using the first global history value;
in a second execution cycle immediately subsequent to the first execution cycle, generate a first branch prediction from the PHT based on the first global history value;
in a third execution cycle immediately subsequent to the second execution cycle:
if the queue is empty and there is a correctly predicted not-taken branch, then use the generated first branch prediction for a branch prediction value in the third execution cycle;
if there is not a correctly predicted not-taken branch, then enter the generated first branch prediction in a first portion of the queue;
in a fourth execution cycle immediately subsequent to the third execution cycle, if there is a correctly predicted not-taken branch, use the first branch prediction in the first portion of the queue for the branch prediction value and remove the first branch prediction from the first portion of the queue; and
repeat a sequence of the first execution cycle through the fourth execution cycle as long as a taken branch is not detected, such that actions taken in one iteration of the sequence may overlap the actions taken in another iteration of the sequence.

10. The apparatus of claim 9, wherein the first global history value is a speculative history value.

11. The apparatus of claim 10, wherein the speculative history value represents that one or more future branches are not-taken.

12. The apparatus of claim 9, wherein the queue is a first-in-first-out (FIFO) queue.

13. The apparatus of claim 9, wherein a size of the queue is determined by a pipeline depth between an address generation stage and a branch prediction stage of the processor.

14. The apparatus of claim 9, further comprising:
the queue further configured to be flushed responsive to at least a part of the instruction pipeline being flushed.

15. The apparatus of claim 9, wherein the processor is further configured to:
in a subsequent second execution cycle, generating a second branch prediction data from the PHT based on a second global history value;
in a subsequent third execution cycle, if there is not a correctly predicted not-taken branch, then enter the generated second branch prediction data in a second portion of the queue; and
wherein if the first branch prediction in the first portion of the queue is used for the branch prediction value and removed from the first portion of the queue:
move the generated second branch prediction data into the first portion of the queue.

16. The apparatus of claim 9, wherein the PHT includes saturating counters for all values of a combination of global history values and address.

17. A non-transitory computer-readable storage medium storing a set of instructions for execution by one or more processors to perform branch prediction, the set of instructions comprising:
an emptying code segment for emptying a queue of an instruction pipeline if a taken branch is detected;
an accessing code segment, that is executed immediately subsequent to the emptying code segment, for accessing a pattern history table (PHT) using a first global history value, in a first execution cycle;
a generating code segment, that is executed immediately subsequent to the accessing code segment for generating a first branch prediction data from the PHT based on the first global history value, in a second execution cycle;
a first using code segment, that is executed immediately subsequent to the generating code segment, for using the first generated branch prediction data for a branch prediction value in a third execution cycle if the queue is empty and there is a correctly predicted not-taken branch;
a placing code segment, that is executed immediately subsequent to the generating code segment, for placing the first generated branch prediction data in a first portion of the queue in the third execution cycle if there is not a correctly predicted not-taken branch;
a second using code segment, that is executed immediately subsequent to the first using code segment, for using the first branch prediction data in the first portion of the queue for the branch prediction value in a fourth execution cycle, and removing the first branch prediction data from the first portion of the queue if there is a correctly predicted not-taken branch; and
a repeating code segment for repeating a sequence of the first execution cycle through the fourth execution cycle as long as a taken branch is not detected, such that actions taken in one iteration of the sequence may overlap the actions taken in another iteration of the sequence.

18. The non-transitory computer-readable storage medium according to claim 17, wherein the set of instructions are hardware description language (HDL) instructions used for manufacturing a device.

* * * * *